US009129268B2

(12) United States Patent
Hazlehurst

(10) Patent No.: US 9,129,268 B2
(45) Date of Patent: Sep. 8, 2015

(54) DIRECTING PAYMENTS TO SATISFY PERIODIC FINANCIAL OBLIGATIONS

(75) Inventor: Peter Hazlehurst, Foster City, CA (US)

(73) Assignee: Yodlee, Inc., Redwood City, CA (US)

( * ) Notice: Subject to any disclaimer, the term of this patent is extended or adjusted under 35 U.S.C. 154(b) by 716 days.

(21) Appl. No.: 12/724,749

(22) Filed: Mar. 16, 2010

(65) Prior Publication Data

US 2010/0250416 A1 Sep. 30, 2010

Related U.S. Application Data

(60) Provisional application No. 61/162,905, filed on Mar. 24, 2009.

(51) Int. Cl.
| G06Q 40/00 | (2012.01) |
| G07F 19/00 | (2006.01) |
| G06Q 20/00 | (2012.01) |
| G06Q 20/10 | (2012.01) |
| G06Q 20/26 | (2012.01) |
| G06Q 20/40 | (2012.01) |
| G06Q 30/04 | (2012.01) |

(52) U.S. Cl.
CPC .............. *G06Q 20/00* (2013.01); *G06Q 20/102* (2013.01); *G06Q 20/26* (2013.01); *G06Q 20/405* (2013.01); *G06Q 30/04* (2013.01)

(58) Field of Classification Search
USPC .......................................................... 705/34
See application file for complete search history.

(56) References Cited

U.S. PATENT DOCUMENTS

| 5,913,202 A * | 6/1999 | Motoyama ................. 705/36 R |
| 6,199,007 B1 | 3/2001 | Zavarehi et al. |
| 6,278,993 B1 | 8/2001 | Kumar et al. |
| 6,567,850 B1 | 5/2003 | Freishtat et al. |
| 6,871,220 B1 | 3/2005 | Rajan et al. |
| 6,996,542 B1 * | 2/2006 | Landry ........................... 705/40 |
| 7,080,035 B1 * | 7/2006 | Williams et al. ................ 705/40 |
| 7,107,243 B1 * | 9/2006 | McDonald et al. ............. 705/40 |
| 7,200,804 B1 | 4/2007 | Khavari et al. |
| 7,526,448 B2 * | 4/2009 | Zielke et al. .................... 705/40 |

(Continued)

OTHER PUBLICATIONS

Authorized Officer Erik Van Dop, European Patent Office, International Search Report and Written Opinion for International Application No. PCT/US2010/027456, dated Jun. 15, 2010, 12 pages.

(Continued)

*Primary Examiner* — Ashford S Hayles
(74) *Attorney, Agent, or Firm* — Fish & Richardson P.C.

(57) ABSTRACT

Methods, computer program products, and systems, related to financial payments are provided. Data corresponding to payments made by a first financial institution is analyzed to identify periodic financial obligations and a specific biller associated with each obligation. A visual user interface including a mechanism through which a user can submit a make-payments notification is generated and provided to a client computer. A first make-payments notification identifying an obligation and a specific biller is received. A determination is made as to whether the specific biller is automatically requesting payments to satisfy the obligation identified in the make-payments notification, and if so, a cease-billing instruction is caused to be sent to the specific biller. A billing instruction, instructing the first specific biller to automatically request payments from a second financial institution to satisfy the obligation, is caused to be sent to the first specific biller.

33 Claims, 6 Drawing Sheets

(56) References Cited

U.S. PATENT DOCUMENTS

| | | | |
|---|---|---|---|
| 7,752,130 B2* | 7/2010 | Byrd et al. | 705/40 |
| 7,848,974 B1* | 12/2010 | Sheehan | 705/35 |
| 7,917,435 B2* | 3/2011 | Hall et al. | 705/40 |
| 8,073,773 B2* | 12/2011 | Kozee et al. | 705/40 |
| 8,121,947 B1* | 2/2012 | Barth et al. | 705/40 |
| 8,392,300 B1* | 3/2013 | Battula et al. | 705/35 |
| 8,630,947 B1* | 1/2014 | Freund | 705/40 |
| 2001/0032183 A1* | 10/2001 | Landry | 705/40 |
| 2002/0007343 A1* | 1/2002 | Oyama et al. | 705/39 |
| 2002/0019810 A1 | 2/2002 | Kumar et al. | |
| 2002/0069148 A1* | 6/2002 | Mutschler et al. | 705/35 |
| 2002/0184144 A1* | 12/2002 | Byrd et al. | 705/40 |
| 2002/0198835 A1* | 12/2002 | Watson | 705/40 |
| 2003/0191711 A1* | 10/2003 | Jamison et al. | 705/40 |
| 2003/0225688 A1* | 12/2003 | Dobbins | 705/39 |
| 2004/0143546 A1* | 7/2004 | Wood et al. | 705/40 |
| 2004/0210517 A1* | 10/2004 | Brooks et al. | 705/39 |
| 2005/0021456 A1* | 1/2005 | Steele et al. | 705/39 |
| 2005/0033690 A1* | 2/2005 | Antognini et al. | 705/40 |
| 2005/0097050 A1* | 5/2005 | Orcutt | 705/45 |
| 2005/0125321 A1* | 6/2005 | Gerstner et al. | 705/35 |
| 2005/0149436 A1* | 7/2005 | Elterich | 705/39 |
| 2005/0234820 A1* | 10/2005 | MacKouse | 705/40 |
| 2006/0101323 A1 | 5/2006 | Satyavolu | |
| 2006/0116949 A1* | 6/2006 | Wehunt et al. | 705/35 |
| 2006/0122932 A1* | 6/2006 | Birtwell et al. | 705/40 |
| 2006/0206425 A1* | 9/2006 | Sharma | 705/40 |
| 2007/0067239 A1* | 3/2007 | Dheer et al. | 705/40 |
| 2007/0130347 A1 | 6/2007 | Rangan et al. | |
| 2007/0180380 A1 | 8/2007 | Khavari et al. | |
| 2007/0255650 A1* | 11/2007 | Destrempes et al. | 705/39 |
| 2008/0015982 A1* | 1/2008 | Sokolic et al. | 705/39 |
| 2008/0065520 A1* | 3/2008 | Hazlehurst et al. | 705/35 |
| 2009/0112662 A1* | 4/2009 | Mullen et al. | 705/7 |
| 2009/0171839 A1* | 7/2009 | Rosano et al. | 705/40 |
| 2009/0292603 A1* | 11/2009 | Wallach | 705/14.17 |
| 2009/0327108 A1* | 12/2009 | Swierz et al. | 705/31 |
| 2010/0100480 A1* | 4/2010 | Altman et al. | 705/40 |
| 2010/0169194 A1* | 7/2010 | Richey et al. | 705/30 |
| 2010/0179882 A1* | 7/2010 | Rigole | 705/26 |
| 2010/0191596 A1* | 7/2010 | Goldman | 705/14.36 |
| 2010/0223152 A1* | 9/2010 | Emerson et al. | 705/26 |
| 2010/0228671 A1* | 9/2010 | Patterson | 705/44 |
| 2010/0306103 A1* | 12/2010 | Hankins et al. | 705/40 |
| 2012/0323790 A1* | 12/2012 | Henry | 705/44 |
| 2013/0030996 A1* | 1/2013 | Mackouse | 705/40 |

OTHER PUBLICATIONS

European Office Action received in European Patent Application No. 10 713 389.4-1955, received May 20, 2014. 4 pages.

"Notice from the European Patent Office dated Oct. 1, 2007 Concerning Business Methods." Official Journal of the European Patent Office, vol. 30, No. 11. Published Nov. 1, 2007. Munich, Germany. pp. 592-593.

* cited by examiner

| Transaction Date: (302) | Description: (304) | Amount: (306) |
|---|---|---|
| 308 — 11/21/2005 | VISA VERIZON 1204 SAL SALINAS CA | $60.45 |
| 310 — 11/22/2005 | AUTOPAY COMCAST ACNT 14256-223AB | $42.59 |
| 312 — 12/01/2005 | PG&E NORTHERN CALIFORNIA | $120.00 |
| 314 — 12/06/2005 | MCDONALDS WATSONVILLE CA | $5.98 |
| 316 — 12/21/2005 | VISA VERIZON 1204 SAL SALINAS CA | $60.50 |

FIG. 3

TRANSFER BILLER - Select Biller to add as Payee

We have retrieved the following biller transactions from your Citibank account. Please select the Payees that you would like to transfer to Chase Credit Card

| | Payee | Last Paid on | Amount |
|---|---|---|---|
| ☐ | ATT Phone Bill | 12/29/2008 | $79.00 |
| ☐ | Comcast Internet Service | 12/27/2008 | $40.00 |
| ☐ | Netflix | 1/10/2009 | $18.00 |
| ☐ | TMCC Car Loan | 1/05/2009 | $457.90 |
| ☐ | Sallie Mae | 1/12/2009 | $267.43 |
| ☐ | PG&E | 12/27/2008 | $90.34 |
| ☐ | American Express SMB | 1/07/2009 | $1400.00 |

Cancel                                                    Continue

FIG. 5

DIRECTING PAYMENTS TO SATISFY PERIODIC FINANCIAL OBLIGATIONS

CROSS-REFERENCE TO RELATED APPLICATIONS

This application claims the benefit under 35 USC 119(e) of U.S. Provisional Patent Application Ser. No. 61/162,905, titled "Directing Payments to Satisfy Periodic Financial Obligations," filed Mar. 24, 2009.

TECHNICAL FIELD

This disclosure relates to payments made to satisfy periodic financial obligations of a user.

BACKGROUND

As the Internet has grown in popularity, more users are turning to services provided over the Internet to help manage their finances.

These services can be provided by financial institutions, such as banks or credit card companies, or by account aggregators who aggregate and present user-specific financial information from one or more financial institutions.

Users typically use a user name and password to log-in to web page(s) maintained by a financial institution or an account aggregator. From the web page(s), the user can access online banking, electronic bill payment, account aggregation, and other online financial services.

Online banking provides a user access to his or her financial information and also offers a number of services to a user. Users can, for example, view their statements online, including transaction details and cancelled checks, transfer balances online, and apply for loans online.

Users can also use electronic bill payment to pay bills online by transferring money from an account to a creditor through the Internet. Many financial institutions and account aggregators allow a user to pay all of his or her bills from their web page(s). Users can also schedule payments to creditors from some financial institution and account aggregator web pages. Users can also authorize automatic payments to satisfy periodic financial obligations. A payment is made automatically when, for example, a biller charges a user account or debits a user account without direct user input.

Account aggregation involves presenting financial information related to one or more accounts of a user in one place. Each account can be with a different financial institution. Account aggregation makes it easy for a user to quickly get a picture of his or her overall finances.

SUMMARY

This specification relates to identifying payments made to satisfy periodic financial obligations, and in response to user input, instructing specific billers to request payment from a different source.

In general, one aspect of the subject matter described in this specification can be embodied in methods that include the actions of collecting in a computer system data corresponding to one or more user transactions. Each transaction is a payment made by a first financial institution. One or more periodic financial obligations of a first user are identified from the data. A specific biller is associated with each periodic financial obligation in the computer system. A visual user interface is generated with the computer system and provided to a client computer of the first user. The visual user interface identifies one or more specific billers. Each specific biller is associated with at least one of the periodic financial obligations of the first user. The visual user interface provides a mechanism through which the first user can submit a make-payments notification identifying one of the one or more specific billers. A first make-payments notification is received in the computer system. The first make-payments notification identifies a first specific biller associated with a first periodic financial obligation. It is determined in the computer system whether the first specific biller is automatically requesting payments to satisfy the first periodic financial obligation from the first financial institution. If so, a first cease-billing instruction is caused to be sent to the first specific biller. The first cease-billing instruction instructs the second biller to stop requesting payments to satisfy the first periodic financial obligation from the first financial institution. A first billing instruction is caused to be sent to the first specific biller. The first billing instruction instructs the first specific biller to automatically request payments from a second financial institution to satisfy the first periodic financial obligation. Other implementations include corresponding systems, apparatus, computer program products, and computer readable media.

These and other implementations can optionally include one or more of the following features. The first specific biller can be automatically requesting payments to satisfy the first periodic financial obligation from the first financial institution. The data corresponding to one or more user transactions can include a description of each user transaction, and identifying a periodic financial obligation can include using the descriptions of one or more user transactions to identify automatic payments. The data corresponding to one or more user transactions can include a description of each user transaction, and identifying a periodic financial obligation can include using the descriptions of one or more user transactions to identify periodic payments.

One or more user transactions can be categorized into a respective transaction category, and a periodic financial obligation can be identified using the transaction categories of one or more user transactions. Identifying a periodic financial obligation can include using the identity of a second specific biller with whom the transaction is conducted.

The first specific biller can be further associated with a second periodic financial obligation of the first user. It can be determined whether the first specific biller is automatically requesting payments to satisfy the second periodic financial obligation from a third financial institution, and if so, a second cease-billing instruction can be caused to be sent to the first specific biller. The second cease-billing instruction can instruct the first specific biller to stop requesting payments to satisfy the second periodic financial obligation from the third financial institution. A second billing instruction can be caused to be sent to the first specific biller. The second billing instruction can instruct the second biller to automatically request payments from a second financial institution to satisfy the second periodic financial obligation.

An enrollment notification can be received in the computer system. The enrollment notification can indicate that the first user authorizes the collection of the data corresponding to the one or more automatic user transactions.

Additional data corresponding to one or more additional user transactions can be collected in the computer system. The additional data can be examined in the computer system to determine if the first financial institution has stopped making payments to the first specific biller to meet the first periodic financial obligation. For each identified periodic financial obligation, the future value of revenue for the second financial institution associated with making payments to a specific biller to meet the periodic financial obligation can be predicted in the computer system. An incentive associated with each identified specific biller can be calculated. The incentive is a benefit the first user will receive for requesting that the second financial institution make payments to the specific biller to meet one or more periodic financial obligations. The incentive can be calculated based on the predicted future value of revenue for the second financial institution associated with making payments to the specific biller to meet the one or more periodic financial obligations. The visual user interface can further display the incentive associated with each identified specific biller. A fee amount can be calculated. A payment request can be caused to be sent to the second financial institution. The payment request can specify a payment equal to the fee amount. A notification that a payment equal to the fee amount has been received from the second financial institution can be received in the computer system.

Data corresponding to one or more user transactions through a first financial institution can be collected in the computer system. The data can be analyzed to determine revenue received by the second financial institution as a result of the payments made to meet the first periodic financial obligation. A report of the received revenue can be generated in the computer system. The report can be caused to be sent to the second financial institution.

Particular embodiments of the subject matter described in this specification can be implemented to realize one or more of the following advantages. Users can view all of their payments in a consolidated dashboard of bills that makes it easier to understand their total bill payment obligations. Users can easily begin automatic payments to satisfy their periodic financial obligations. Users can easily change which financial institution is making automatic payments to satisfy their periodic financial obligations. A financial institution can increase its revenue by making more automatic payments on behalf of users.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 illustrates example transaction data, formatted for display.

FIG. 5 is a screen shot of an example user interface.

DETAILED DESCRIPTION

Figure 1:
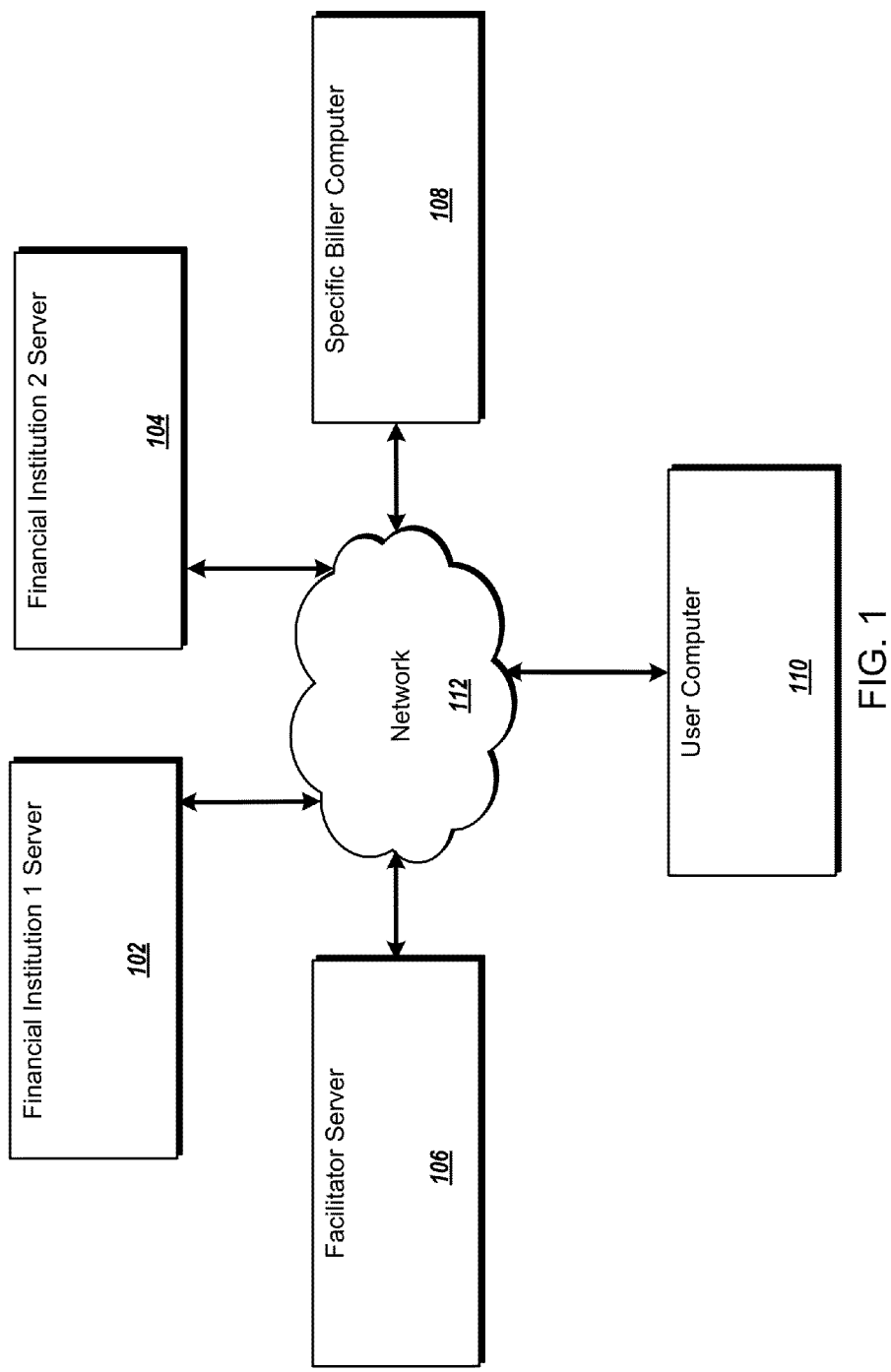
FIG. 1 is an illustration of the interactions of the computer systems of the five main parties.

FIG. 1 illustrates the interaction of the relevant parties. Computer systems 102, 104, 106, 108, and 110 of a first financial institution, a second financial institution, a facilitator, a specific biller, and a user, respectively, are connected through a network 112, e.g., the Internet. While only one computer for each party is shown, each party can have multiple computers.

Each financial institution is an institution that provides financial services, deals in financial instruments, or lends, invests, or stores money. Examples of financial institutions include banks, brokerage firms, credit card companies, credit unions, and savings and loans. Each financial institution has financial information about users who have an account with the financial institution stored on its server 102 or 104, respectively, for example, in a database. The financial information can also be stored on the facilitator's server 106. A user can have an account with the financial institution when, for example, the user deposits money at the institution or has a line of credit provided by the institution.

Financial information includes, for example, customer data, account data, financial institution data, payee data, and transaction data. Customer data can include the customer's name and contact information, e.g., the customer's address, telephone number, and email address. Customer data can also include the customer's password or PIN. Account data can include the customer's account numbers, financial institutions, and account balances. The financial institution data can include the financial institution's name and address and the financial institution's ABA or routing number. Where the financial institution's server 102 makes electronic payments to payees, the payee data can include the payee's name, contact information, e.g., the customer's address, telephone number, and email address, and can also identify the bank and account number which receive payments. The transaction data includes data for individual transactions, e.g., the identity of customer, the identity of payee, date of the transaction, the amount of payment, the account from or to which payment will be made, and a transaction identifier, e.g., a check number. Transaction data can also include additional information about the payee such as the payee's address or the bank and account number where the payee received the payment. Transaction data can also include a summary of the transaction, e.g. a short description of the transaction.

A user has an account with the first financial institution. The user also has an account with the second financial institution and uses a computer 110 to access financial information related to the account with the second financial institution from the facilitator's server 106. The facilitator's server 106 transmits data including the requested financial information to the user's computer 110. The user's computer 110 then presents the requested financial information to the user. A user may access information about multiple accounts at once.

The specific biller's computer 108 is used by the specific biller to receive payment instructions and send payment requests. A specific biller submits requests for payment to a financial institution or a user for, for example, goods or services rendered. Examples of specific billers include a cell phone company, a utility company, and a cable company.

The facilitator's server 106 runs applications that provide three main services: account aggregation, presentation of financial information, and automatic bill payments. The facilitator's server 106 can provide these services directly to a user, or the facilitator can act as a backend provider and provide software, support, and other tools to the second financial institution's server 104 to allow the second financial institution's server 104 to provide some or all these services to a user. In some implementations, the facilitator and the second financial institution are the same entity, and the facilitator's server 106 and the financial institution 104 are the same server.

When the facilitator's server 106 provides these services directly to a user, it can do so on behalf of the second financial institution. In this implementation, the facilitator's server 106 can optionally brand communications it sends to the user's computer 110 with the second financial institution's logo, colors, or other information so that the user, viewing the communication on his or her computer 110, believes he or she is interacting with the second financial institution's server 104 rather than the facilitator's server 106. In brief, the facilitator's server 106 can store data associating financial institutions with graphic images and color codes, e.g., in a database. When the facilitator's server 106 generates a user interface, e.g. a web page, branded as a financial institution, the server 106 inserts the graphic images and color codes associated with the financial institution into the user interface that is then sent to the user, e.g., into a markup language document corresponding to a web page.

Account aggregation involves collecting financial information about a user. Data representing this information is optionally stored in a data repository, e.g., a database, on the facilitator's server 106, on the first financial institution's server 102, or on the second financial institution's server 104.

Financial information can be collected in different ways. For example, in some implementations, information is received directly from a financial institution's server 102 or 104. In some implementations, the facilitator's server 106 runs one or more agents to extract user-specific financial information from various web pages and other consumer-accessible channels, for example public OFX feeds. An agent is a computer program that extracts financial information by, for example, screen scraping by parsing the HTML code of web pages and identifying relevant information, or by extracting financial information from data feeds.

A web page is a block of data identified by a URL that is available on the Internet. One example of a web page is a HyperText Markup Language (HTML) file. Web pages commonly contain content; however, web pages can also refer to content outside the web page that is presented when the web page loads in a user's web browser. Web pages can also generate content dynamically based on interactions with the user.

A public OFX feed is a stream of financial data sent to another computer, for example, over the Internet, by a server of one or more financial institutions, where the data is formatted in accordance with the Open Financial Exchange standard.

Other methods of gathering financial information are also envisioned.

Financial information is presented to the user through one or more user interfaces generated by the facilitator's server 106 and sent to the user's computer 110. The user interface can also provide traditional on-line services associated with a financial institution. For example, for banks, credit unions, and savings and loans, these traditional on-line services include paying bills, transferring funds electronically, and reviewing statements. For credit card companies, the traditional on-line services include paying bills, reviewing transactions, reviewing statements, performing balance transfers between two credit cards, and requesting a credit line increase. For brokerage firms, the traditional on-line services include providing account information, providing information about a user's investments, supporting on-line trading, and providing real-time quotes.

The user interfaces can be generated directly by the facilitator's server 106 or by the second financial institution's server 104 with backend support from the facilitator. Backend support includes software, support, and other tools that allow the second financial institution's server 104 to generate user interfaces to present financial information to the user through the user's computer 110. These tools can be software based, hardware based, or both. In some implementations, the user interface is a webpage.

The facilitator's server 106 also provides automatic bill payment services that allow a user to easily select transactions made through the first financial institution that are candidates for automatic bill payment and cause future payments to be automatically made through the second financial institution. Transaction data in the aggregated financial information is used to identify one or more periodic financial obligations of the user. Each periodic financial obligation is a regularly repeating obligation that a user owes to a specific biller. For example, a cell phone user with a monthly cell phone plan needs to pay his or her cell phone bill every month. The cell phone owner is the user, the specific biller is the cell phone company being paid, and the periodic financial obligation is obligation to pay the cell phone bill each month. An obligation can still be a periodic financial obligation even when the amount owed varies from month to month, for example, a user may owe $20 on his or her cell phone bill one month and $30 the next month.

The facilitator's server 106 associates each periodic financial obligation with a specific biller. For example, the cell phone bill will be associated with the cell phone company. The facilitator's server 106 generates a user interface, e.g. a web page, that identifies one or more specific billers (where each specific biller is associated with at least one periodic financial obligation of the user). The user interface allows a user to use his or her computer 110 to submit a make-payments notification to facilitator's server 106. The make-payments notification identifies a specific biller and one or more financial obligations to that specific biller that the user would like to have automatically paid by the second financial institution. When the facilitator's server 106 receives the make-payments notification, it determines whether the specific biller is automatically requesting payment from the first financial institution to meet the identified period financial obligations, and, if so, it sends data to the specific biller's computer 108 instructing the specific biller to stop automatically requesting payments from the first financial institution to satisfy the periodic financial obligation(s). The facilitator's server 106 then sends data to the specific biller's computer 108 instructing the specific biller to automatically request payments from the second financial institution to satisfy the periodic financial obligation(s).

Figure 2:
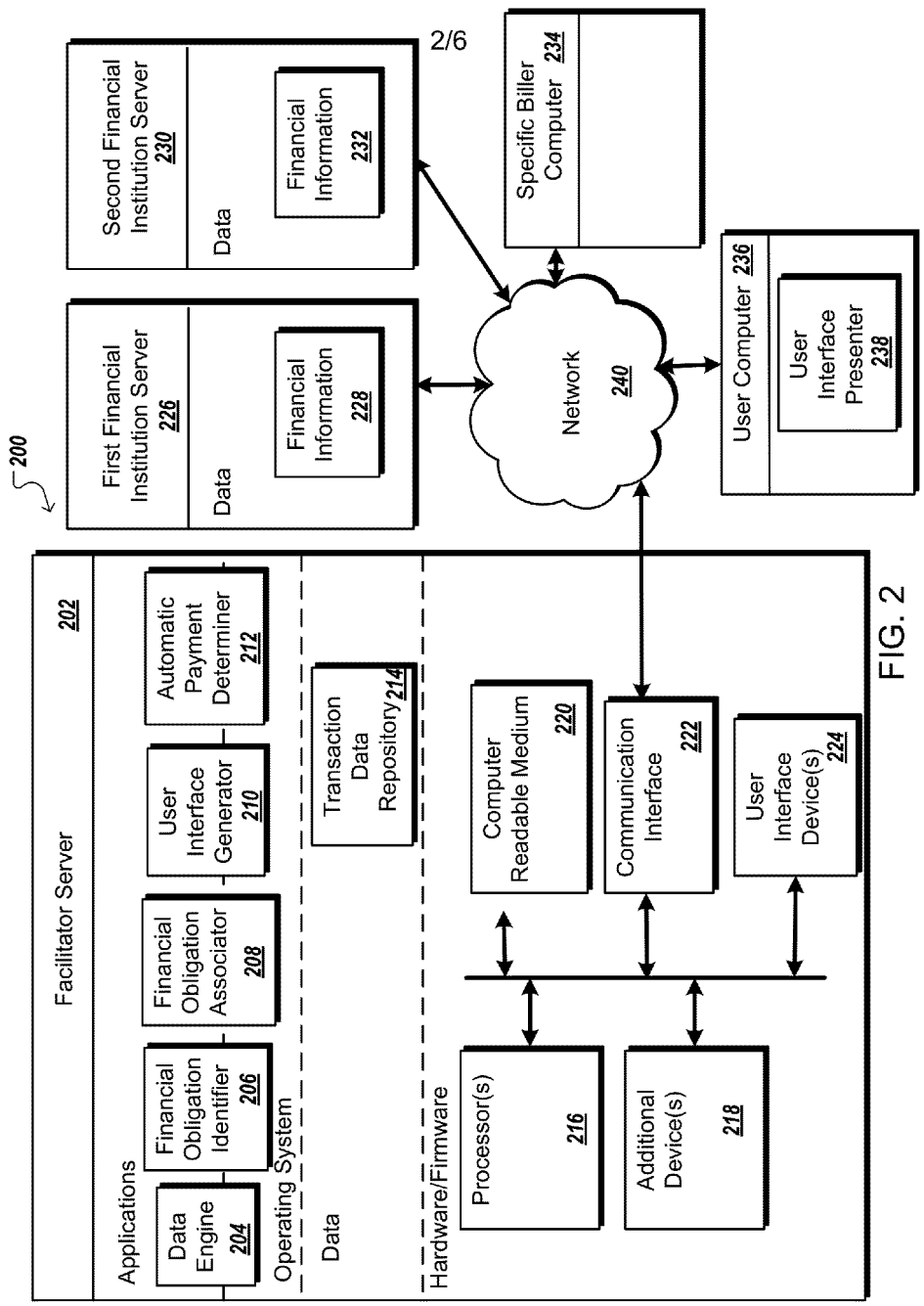
FIG. 2 is an example architecture of the computer systems of the parties.

FIG. 2 illustrates an example architecture of a system 200. A facilitator's server 202, a first financial institution's server 226, a second financial institution's server 230, a specific biller's computer 234, and a user's computer 236 are connected through a network 240, e.g., the Internet. While separate computers are shown for each party in FIG. 2, the computers can be combined. For example, the facilitator's server 202 and the second financial institution's server 230 can be the same computer.

The facilitator has one or more servers 202. While only one server is shown in FIG. 2, multiple servers can be used. In some implementations, at least one of the facilitator's servers 202 is a programmable general purpose computer. In some implementations, at least one of the facilitator's servers 202 is comprised of one or more computers in a server rack.

In various implementations, the facilitator's server 202 stores a transaction data repository 214, such as a database. The transaction data repository 214 stores data corresponding to one or more user transactions. In some implementations, the transaction data repository is stored on the first financial institution's server 226. In some implementations, the transaction data repository is stored on the second financial institution's server 230. The transaction data repository does not have to be solely on one machine, but, for example, can be stored across one or more of the facilitator's server 202, the first financial institution's server 226, and the second financial institution's server 230. In some implementations, the transaction data repository stores additional financial information of one or more users. In some implementations, additional financial information of one or more users is stored in a separate repository, e.g. a database on one or more of the facilitator's server 202, the first financial institution's server 226, or the second financial institution's server 230.

The facilitator's server 202 runs a number of processes, e.g. executable computer programs. In some implementations, the facilitator's server 202 runs a data engine 204, a financial obligation identifier 206, a financial obligation associator 208, a user interface generator 210, and an automatic payment determiner 212. Running a process includes, for example, calling a copy of the process, providing system resources to the process, and communicating with the process through a hardware or software interface. A hardware or software interface is an interface that allows processes to communicate with each other or with system hardware, for example, a system bus or commands specified in an application programming interface. In some implementations, a copy of a process is called by instantiating a copy of the process. In some implementations, a copy of a process is called by referencing an already running copy of the process.

The data engine 204 extracts and gathers data corresponding to user transactions from the first financial institution's server 226 and web pages. The data engine 204 may also extract and gather transaction data from the second financial institution's server 230 and web pages. In some implementations, the data engine 204 collects transaction data on the fly, when it is needed. In another implementation, the financial information is collected in advance and stored. In some implementations, the data engine 204 stores extracted financial information in a financial information repository 212 on the facilitator's server 202. In some implementations, the data engine 204 stores extracted financial information in a transaction data repository on the first financial institution's server 226 or the second financial institution's server 230.

The financial obligation identifier 206 analyzes transaction data and identifies one or more periodic financial obligations of a user, for example, by examining descriptions of one or more transactions included in the data, categorizing one or more transactions included the data, or examining to whom one or more payments in the transaction data were made.

The financial obligation associator 208 associates a periodic financial obligation with a specific biller.

The user interface generator 210 generates user interfaces, such as web pages, and sends these through the communication interface 222 through the network 240 to the user's computer 236 for presentation to the user. The user interfaces contain financial information relevant to the user. The user interfaces can also identify one or more specific billers that were associated with a periodic financial obligation by the financial obligation associator 208 and provide a mechanism for a user to submit a make-payments request requesting that the second financial institution make automatic payments to one of the specific billers to satisfy the periodic financial obligation.

The automatic payment determiner 212 determines whether the first financial institution is already making automatic payments to the specific biller to satisfy a periodic financial obligation.

The facilitator's server 202 also has one or more processors 216, one or more additional devices 218, a computer readable medium 220, a communication interface 222, and one or more user interface devices 224.

The facilitator sever 202 communicates with the first financial institution's server 226, the second financial institution's server 230, the specific biller's computer 234, and the user's computer 236 through its communication interface 222. For example, the facilitator's server 202 receives notifications and sends instructions through its communication interface 222. The facilitator's server 202 receives make-payments notifications from the user's computer 236 through the communication interface 222. The facilitator's server 202 sends cease-billing instructions and billing instructions to the specific biller's computer 234 through the communication interface 222. The facilitator's server 202 also sends generated user interfaces to the user interface presenter 238 on the user's computer 236 through the communication interface.

A user typically has a programmable general purpose computer 236. The user runs a user interface presenter 238 on this computer that presents user interfaces generated by the facilitator's server 202 to the user's computer 236. Presenting the user interfaces to the user can include displaying the user interfaces on a computer monitor or other display device. Presenting the user interfaces can also include any other method of conveying information to the user, for example presenting sounds corresponding to the user interfaces or providing haptic feedback corresponding to the user interfaces.

In some implementations, the user interface presenter 238 is a computer program that presents data, including for example, text and pictures, in a format specified by the facilitator's server 202. In some implementations, the user interface presenter 238 is a web browser, for example, Microsoft Internet Explorer, available from Microsoft Corporation of Redmond, Wash. The web browser 242 receives one or more web pages from the facilitator's server 202 and presents the web pages to the user.

The first financial institution has one or more servers 226. While only one server is shown in FIG. 2, multiple servers can be used. In some implementations, at least one of the first financial institution's servers 226 is a programmable general purpose computer. In some implementations, at least one of the first financial institution's servers 226 is comprised of one or more computers in a server rack.

In various implementations, the first financial institution's server 226 stores user financial information 228 related to accounts a user has with the financial institution.

In some implementations, the first financial institution's server 226 also stores a transaction data repository, such as a database, that stores data corresponding to user transactions.

The second financial institution has one or more servers 230. While only one server is shown in FIG. 2, multiple servers can be used. In some implementations, at least one of the second financial institution's servers 230 is a programmable general purpose computer. In some implementations, at least one of the second financial institution's servers 230 is comprised of one or more computers in a server rack.

In various implementations, the second financial institution's server 230 stores user financial information 232 related to accounts a user has with the financial institution.

In some implementations, the second financial institution's server 230 also stores a transaction data repository, such as a database, that stores data corresponding to user transactions.

The specific biller has a computer 234 through which it receives cease-billing instructions and billing instructions. In some implementations, the specific biller's computer also submits payment requests to the first financial institution's server 226 and the second financial institution's server 230 and receives notification of payments.

FIG. 3 illustrates sample transaction data formatted in a table for display. The names and data presented throughout this application are exemplary and do not necessarily indicate actual transactions.

While FIG. 3 illustrates one possible structure and format for the transaction data, a number of other structures and formats are possible, for example, storing the specific biller as a separate part of the data or formatting the transaction data as a database.

The data in FIG. 3 is arranged in a table. Each column in the table corresponds to a field. The transaction date 302 is the date on which the transaction was conducted. The description 304 is a brief description of the transaction. The description may include the specific biller, the address of the specific biller, a summary of why the transaction was made, or other information relevant to the transaction. The amount 306 is the amount of the transaction, e.g. the amount of the payment. Each row in the table corresponds to a particular transaction. For example, row 308 is for a payment made to Verizon on Nov. 21, 2005. Other fields and other arrangements of the data are also possible.

The transaction data can be used to identify periodic financial obligations in a number of ways. In some implementations, the financial obligation identifier process on the facilitator's server parses the description and extracts words that indicate an automatic payment. For example, in entry 310, the description specifies "autopay." This word can be used to identify the payment as an automatic payment, and to identify an associated periodic financial obligation.

In some implementations, the financial obligation identifier process on the facilitator's server parses the description and extracts words to identify the specific biller to whom a payment was made. For example, the description of transaction 312 is "PG&E Northern California." The financial obligation identifier process can parse this text and extract PG&E Northern California as the specific biller. Once the specific biller is identified, the financial obligation identifier process on the facilitator's server can use the specific biller's identity to decide whether the transaction should be used to identify a periodic financial obligation, for example, by comparing the specific biller to a database that identifies specific billers to which users owe periodic financial obligations. For example, in entry 308, Verizon is a company to which people can make automatic payments (for example, automatic payments of monthly cell phone bills). Therefore, entry 308 can be used to identify a periodic financial obligation.

In some implementations, the financial obligation identifier process categorizes the payment and uses the category to determine whether a periodic financial transaction should be identified. For example, in entry 312, PG&E Northern California is a utility company. People usually pay their utility bills once a month. Thus, the financial obligation identifier process would identify a periodic financial obligation owed to the utility company. In contrast, in entry 314, a payment is made to McDonalds. McDonalds is a restaurant. People usually do not pay restaurants on a periodic basis, but instead pay restaurants as services are rendered. Thus, a payment to a restaurant would not be used to identify a periodic financial obligation.

In some implementations, the financial obligation identifier process on the facilitator's server identifies a periodic financial obligation when payments of similar amounts to the same specific biller appear regularly in the data. For example, entry 308 is a payment to Verizon for $60.45. Entry 316 is a payment made about a month later to Verizon for $60.50. These two similar payments of about $60 a piece made to the same biller made about a month apart can be used to identify a periodic financial obligation.

In some implementations, the facilitator's server identifies a periodic financial obligation when payments made at regular dates appear in the transaction data, regardless of the amount of the payments. For example, entries 308 and 316 are entries made to the same biller (Verizon) about a month apart. Therefore, they can be used to identify a periodic financial obligation, regardless of the amount of payment.

Additional details on how transaction data can be used to identify periodic financial obligations are given below in the discussion of FIG. 4.

Figure 4:
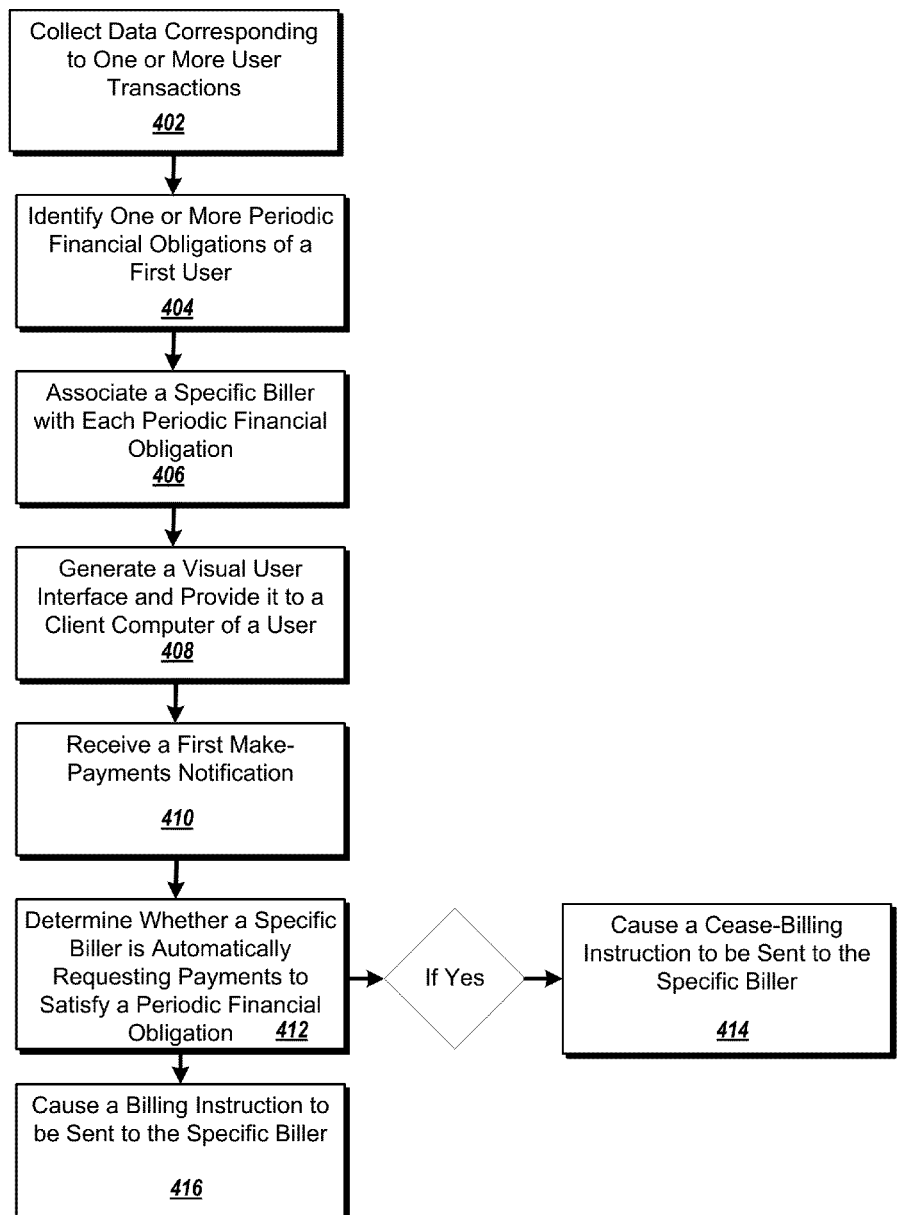
FIG. 4 illustrates a flow chart describing a method.

FIG. 4 illustrates a method for causing a specific biller to request payment from a second financial institution at the request of a user. While the discussion of FIG. 4 below describes a facilitator's server performing the steps of the method, the method can be performed by any computer, for example, a financial institution's server.

In step 402, data corresponding to one or more user transactions involving a first financial institution is collected (e.g., by a facilitator's server).

In various implementations, a data engine computer program is used to collect the data corresponding to one or more user transactions conducted through a first financial institution. In some implementations, one or more agents are also used. Agents are processes or computer programs run, for example, on a facilitator's server or a financial institution's server. Agents can use many techniques to collect transaction data. For example, agents can navigate to relevant websites, and parse the HTML code of the websites to extract transaction data based on a template. The template can be generated by humans, sometimes with input from the user. If a user name or password is needed to access a web page, the agent can use a stored user name and password of the user or can register the user with the web page to create an account for the user. Agents can also search the Internet, including using private search engines available on individual websites. These techniques are explained in more detail in U.S. Pat. Nos. 6,871,220, 6,567,850, 6,278,993, 6,199,007 and 7,200,804, and U.S. Patent Publications 2002/0019810, 2007/0180380 and 2007/0130347, all of which are incorporated by reference. In another implementation, the facilitator receives transaction data in useable form directly from the first financial institution's server.

In some implementations, data is only collected for transactions in a certain time period, for example, the last three months. In some implementations, all available data is collected. In some implementations, all available data is collected, but only transaction data from a certain time period, for example, the last three months, is used in step 404.

In some implementations, before the facilitator's server collects data corresponding to one or more user transactions, it receives an enrollment notification (e.g., through the network from a user's computer). The enrollment notification is data indicating that that a user authorizes the collection of the data corresponding to one or more of the user transactions. The enrollment notification may include additional information such as a user name or password related to each user account from which data is to be collected. The facilitator's server optionally stores some or all of the enrollment notification data.

In step 404, one or more periodic financial obligations of a first user are identified (e.g., by a facilitator's server).

In various implementations, periodic financial obligations are identified by the facilitator's server by examining the stored transaction data. In some implementations, the transaction data is stored as one or more strings, and examining the stored transaction data includes parsing one or more strings and extracting needed information. In some implementations, the transaction data is stored as a relational database, and examining the stored transaction data includes retrieving needed information from the relational database by, for example, performing one or more queries. Other techniques for examining the stored transaction data, based on the form the data is stored in, are also possible.

Various techniques for identifying periodic financial obligations can be used by the facilitator's server. In some implementations, the data corresponding to each transaction includes a description of the transaction. In these implementations, the facilitator's server can identify a periodic financial obligation by parsing the description of the one or more user transactions, recognizing characters that identify a transaction as an automatic payment, and identifying periodic financial obligations corresponding to the automatic payments. For example, words and phrases like "autopay," "e-pay," "electronic payment," "internet service," "pay service," "instant transfer," etc. may be used to identify an automatic payment. The facilitator's server can also identify a periodic financial obligation by parsing the description of the one or more user transactions, recognizing characters that identify a transaction as a periodic payment, and identifying periodic financial obligations corresponding to the periodic payments. For example, words and phrases such as "monthly service charge" or "payment for monthly service" can identify a transaction as a periodic payment.

In some implementations, the facilitator's server categorizes each user transaction into a transaction category. For example, a transaction indicating a payment to Safeway™ (a grocery store) would be classified as a payment to a grocery store, while a transaction indicating a payment to the Pacific Gas and Electric Company™ (a utility company) would be classified as a utility payment. Characterizing transactions into transaction categories can be done, for example, by extracting the identity of the specific biller to whom a payment was made from the transaction data, looking the specific biller up in a database that associates specific billers with categories, and selecting the category associated with the specific biller in the database. In some implementations, the associations in the database are generated based on data received from one or more users computers, where the data associates a given specific biller with a given category. In some implementations, the database is generated based on data received from respective billers' computers, where the data identifies a category for a respective biller. Other sources for the data are also possible. The database is optionally stored on the facilitator's computer. Characterization techniques are explained in more detail in U.S. Patent Publication 2006/0101323, which is incorporated by reference.

Once each user transaction is categorized, the facilitator's server can use the category to identify periodic obligations. In various implementations, once the category for the transaction has been identified the category is looked up in a database that identifies categories that are likely to be associated with periodic financial obligations and transactions that are in categories likely to be periodic financial obligations are used to identify periodic financial obligations. Certain categories of transactions are more likely than others to indicate a periodic financial obligation. For example, a payment to a cell phone company is likely to be part of a periodic financial obligation. Cell phone companies typically send a bill to a customer once each month for all expenses incurred since the last bill. Similarly, a payment to a utility company is likely to be part of a periodic financial obligation. Utility companies typically bill customers once a month for utilities used since the last bill. In contrast, a payment to a restaurant is not likely to be part of a periodic financial obligation. Restaurants charge customers as services are provided. Thus, payments to a restaurant are unlikely to be on a periodic basis, but instead are usually on an as-rendered basis. In some implementations, the database is stored on the facilitator's server. The facilitator can build the database by, for example, receiving data from one or more user's computers indicating that a particular category is likely to be associated with a periodic financial obligation or receiving data from one or more user's computers indicating that a given transaction is part of a periodic financial obligation, analyzing the transaction to determine its category, and adding an entry to the database indicating the category is likely to be associated with periodic financial obligations. Other methods of building the database are also possible.

In some implementations, the facilitator's server identifies a specific biller associated with a transaction and uses that identification to identify a periodic financial obligation of the user. To identify the specific biller associated with a transaction, the facilitator's server examines the transaction data for the transaction and extracts the specific biller. Extracting the specific biller can include, for example, parsing the data if it is stored as a string of text or looking up the specific biller in a database including the transaction. Much as some categories of transactions are more likely than other categories of transactions to correspond to periodic financial obligations, payments to certain specific billers are more likely than payments to other specific biller to correspond to periodic financial obligations. For example, a payment to Pacific Gas and Electric™ is more likely to be associated with a periodic financial obligation than a payment to McDonalds™, because Pacific Gas and Electric™ typically bills users monthly while McDonalds™ typically bills users as services are rendered. In some implementations, once the specific biller is extracted from the data, the specific biller is looked up in a database that identifies specific billers who are likely to be associated with periodic financial obligations. In some implementations, the database is stored on the facilitator's server. The facilitator can build the database by, for example, receiving data from one or more specific billers' computers indicating that the specific biller is likely to be associated with a periodic financial obligation or receiving input from one or more human beings indicating that a specific biller is likely to be associated with a periodic financial obligation. Other sources of data are also possible.

In some implementations, the facilitator's server identifies a periodic financial obligation when payments of similar amounts to the same specific biller appear regularly in the data. For example, if a user regularly paid $50 to the same specific biller each month, the facilitator's server could identify the pattern of payments and identify a periodic financial obligation corresponding to the pattern of payments. In some implementations, the amounts paid do not have to be the same—for example, the amounts could differ by a threshold (e.g., 1% or 5%) and still be used to identify a periodic financial obligation.

In some implementations, the facilitator's server identifies a periodic financial obligation when payments made at regular dates appear in the transaction data. For example, if a user made a payment to a specific biller every two weeks, or the same time each month, the facilitator's server can identify a periodic financial obligation corresponding to those payments. The payments do not have to be made on a completely regular schedule—for example, the payment date could differ by a threshold (e.g., 2 days) and still be used to identify a periodic financial obligation.

In step 406, a specific biller is associated with each periodic financial obligation (e.g., by a facilitator's server).

In various implementations, the facilitator's server associates a periodic financial obligation with a specific biller by examining the transaction data for the one or more transactions used to identify the periodic financial obligation, extracting the specific biller for the one or more transactions, and associating the periodic financial obligation with the specific biller for the one or more transactions.

In step 408, a visual user interface is generated and provided to a user's computer (e.g., by a facilitator's server).

In various implementations, the facilitator's server generates a visual user interface that identifies one or more specific billers (each of whom was associated with a periodic financial obligation in step 406) and provides it to a client computer of a user by, for example, transmitting data comprising the user interface to the user's computer. The visual user interface also provides a mechanism through which a user can submit a make-payments notification identifying one or more of the specific billers. Additional information can be included in the visual user interface, including, for example, additional financial information of the user, the category of the periodic financial obligation, additional information about the specific biller, or an incentive associated with having a second financial institution automatically make-payments to each specific biller. The mechanism can be anything that allows a user to make a selection and indicate his or her computer should transfer data identifying the selection to the user. For example, the mechanism can be a button displayed in the user interface that the user can click on to instruct his or her computer to send data indicating which specific billers have been selected to the facilitator's server.

In some implementations, the visual user interface is a web page. The facilitator's server generates the web page using, for example, a user interface generator program. The facilitator's server then transmits data comprising the web page to a user's computer, for example, through a network. The user's computer receives the data comprising the web page and presents the web page to the user, e.g. in a web browser. The user's computer also receives selections and other input from the user and transmits a notification of the user's selection to the facilitator's server, for example, through a network.

Other visual user interfaces are possible, for example data including text and pictures that are presented to a user by a program other than a web browser.

In some implementations, before the user interface is transmitted to the user's computer, the identity of the user can be verified (e.g., by the facilitator's server). The facilitator's server receives data including login information from the user's computer, for example, through a network. Login information includes some user identifying information, for example, the MAC address of the user's computer or a username and password. The facilitator's server uses the login information to determine and verify the user's identity.

In some implementations, a user's computer does not transmit data comprising login information to the facilitator's server, but instead sends the data to a financial institution's server, for example, the first financial institution's server. The financial institution's server verifies the user's identity and sends data comprising an authentication message to the facilitator's server through, for example, the network. The facilitator's server uses the authentication message to determine and verify the user's identity.

In some implementations, the user interface includes additional information, such as a user incentive, based on the predicted future value of revenue to the second financial information from making payments to a specific biller to meet a periodic financial obligation.

A financial institution receives revenue from making payments, for example, from interest a user pays on the amount of the payment, from a fee paid by a user, or from an interchange fee paid by the specific biller (e.g., a percentage of the payment, such as 1-2%).

In various implementations, the facilitator's server uses one or more computer programs to predict the future value of revenue. These computer programs predict the future value of revenue by, for example, analyzing transaction data and other inputs.

The future value of revenue can be predicted in various ways. In some implementations, the future value of revenue is based on a flat fee per transaction. In some implementations where a flat fee is charged per transaction, the future value of revenue can be based on the frequency of the periodic financial obligation, i.e., how frequently payments are made. In some implementations, the future value of revenue is based on a fee specific to each category of transaction or each specific biller. In these implementations, the future value of revenue can be predicted based on the categorization of the transaction or the identity of the specific biller.

In some implementations, the future value of revenue depends on the amount of each payment, for example, because a fee charged by the financial institution depends on the amount of each payment or because the future value of revenue includes expected interest payments. In these implementations, the future value of revenue can be predicted in various ways. In some implementations the future value of revenue is based on the category of the periodic financial obligation. Certain categories are more likely to lead to higher revenue. For example, a mortgage payment is usually a consistently large payment. In contrast, a cell phone bill is usually a smaller payment. Thus, the predicted future value of revenue from paying a mortgage payments is higher than the predicted future value from paying a cell phone bill. In some implementations, the future value of revenue is based on the amount of money paid to a specific biller in one or more of the prior transactions used to identify the periodic financial obligation. Some bills are fairly consistent from month to month, and so the amount of past bills is indicative of the amount of future bills. For example, a cable bill is usually the same from month to month, while an electricity bill can vary dramatically depending on how much electricity is used during the month. Thus, these implementations may also take into account the consistency of the periodic financial obligation when predicting future revenue based on past transactions. In some implementations, seasonal trends can also be used to predict the future value of revenue. For example, in Houston, Tex., utility bills are usually higher in the summer than the winter, because Houston has very hot summers and relatively mild winters. Thus, more electricity is needed to keep a house cool in the summer than to keep a house warm in the winter. If a user lives in Houston, Tex., the predicted future value of revenue from the utility bill could take this seasonal trend into account by, for example, discounting amounts the user paid in the summer and increasing amounts the user paid in the winter when predicting the future value of revenue, to attempt to arrive at a representative estimate.

In some implementations, the facilitator's server uses one or more computer programs to calculate an incentive for the user based on the predicted future value of revenue. The incentive is a benefit the user will receive in return for allowing the second financial institution to make payments to satisfy a given periodic financial obligation (or obligations) with a given specific biller. The incentive can be any type of incentive used by financial institutions including, for example, cash back or reward points. For example, the incentive can be calculated by taking the predicted future value of revenue and dividing it by 100, thus rewarding the user with one cent for every predicted future dollar. In some implementations, the incentive is included in the visual user interface generated by the facilitator's server.

In step 410, a first make-payments notification is received (e.g., in a facilitator's server).

In various implementations, the first make-payments notification is data sent from a user's computer to the facilitator's server, for example, through a network, that identifies a specific biller and requests that one or more periodic financial obligations associated with the specific biller be paid by a second financial institution. The facilitator's server receives this data and optionally stores it.

In some implementations, the first make-payments notification includes data indicating that all periodic financial obligations associated with the specific biller should be paid by the second financial institution. In some implementations, the first payments notification includes data indicating that a subset of all periodic financial obligations associated with the specific biller should be paid by the second financial institution.

In some implementations, if the facilitator's server does not receive a make-payments notification from a user's computer after generating a user interface and providing it to the first user, it generates one or more user interfaces that include periodic reminders to encourage the user to submit a make-payments notification and provides the user interfaces to the user's computer, for example, by sending data comprising the web pages through a network. In some implementations, if the facilitator's server does not receive a make-payments notification from a user's computer, it generates and sends reminders to the user, for example, by sending a reminder e-mail message to the user.

In step 412, it is determined (e.g., by a facilitator's server) whether a specific biller is automatically requesting payments from a first financial institution to satisfy a first financial obligation.

In various implementations, the facilitator's server determines if the specific biller is automatically requesting payments from a first financial institution to satisfy a given financial obligation by examining the transaction data. For example, the facilitator's server can parse the description of a given transaction and extract words and phrases indicating an automatic payment, e.g. "autopay," "e-pay," "electronic payment," "internet service," "pay service," and "instant transfer." If these words appear in descriptions for transactions associated with the periodic financial obligation (e.g. used to identify the periodic financial obligation or from which the periodic financial obligation could have been identified), then the facilitator's server can determine that the specific biller is automatically requesting payments from the first financial institution to satisfy the periodic financial obligation. Other methods of determining that the specific biller is automatically requesting payments to satisfy a periodic financial obligation are also possible.

If the specific biller is automatically requesting payments from a first financial institution to satisfy a first financial obligation, in step 414 a cease-billing notification is sent to the specific biller (e.g., by a facilitator's server).

In various implementations, the facilitator's server sends data comprising a cease-billing instruction to the specific biller's computer, for example, through a network. The data includes instructions to stop requesting payments from the first financial institution to satisfy the first financial obligation.

In some implementations, a specific biller is automatically requesting payments from a first financial institution to satisfy more than one financial obligation of a user. In these implementations, a cease-billing instruction can be sent for each periodic financial obligation the user indicated the second financial institution should pay, or a single cease-billing instruction can be sent for all periodic financial obligations the user indicated the second financial institution should pay.

In some implementations, once the cease-billing instruction is sent to the specific biller, the facilitator's server continues to collect and analyze transaction data for the user to determine if the first financial institution has stopped making payments to the specific biller to satisfy the periodic financial obligation. For example, the facilitator's server can analyze data for transactions occurring after the cease-billing instruction was sent much as the facilitator's server originally identified the periodic financial obligation from the transaction data. If the facilitator's server identifies the periodic financial obligation again, then it can determine that the first financial institution has not stopped making payments to the first specific biller to meet the first periodic financial obligation. If the user requested that the second financial institution start making payments for multiple financial obligations, all of the financial obligations can be monitored in the same way. In some implementations, if the facilitator's server determines that the first financial institution is still making payments to satisfy the periodic financial obligation, the facilitator's server can notify the user, the specific biller, the first financial institution, or any combination of the three by, for example, sending data comprising a notification through a network to the relevant computer.

In step 416, a billing instruction is sent to the specific biller (e.g., by a facilitator's server).

In various implementations, the facilitator's server sends data comprising the billing instruction to the specific biller's computer, for example, through a network. The data includes instructions to automatically request payments from a second financial institution to satisfy the periodic financial obligation.

In some implementations, the instructions to automatically request payments from a second financial institution include instructions to submit a credit card charge on the user's account with the financial institution. In other implementations, the instructions to automatically request payments from a second financial institution include instructions to debit the user's account with the financial institution. Other instructions are also possible.

In some implementations, a specific biller is associated with more than one periodic financial obligations of a user. In these implementations, a separate billing instruction can be sent to the specific biller for each periodic financial obligation the user indicated should be paid by the second financial institution or a single billing instruction can be sent for each financial obligation the user indicated should be paid by the second financial institution.

In some implementations, the facilitator's server generates a report of the revenue the second financial institution has received as a result of making the payments. The facilitator's server collects transaction data corresponding to one or more user transactions involving the second financial institution. The facilitator's server analyzes this data to determine how much revenue the second financial institution has received as a result of payments made to meet the first periodic financial obligation. For example, the facilitator's server can run one or more computer programs that analyze the transaction data, identify all payments made through the second financial institution to meet the first financial obligation, determine the total amount of the payments or total number of payments, and calculate the revenue the second financial institution can expect to receive from these payments. The calculated revenue is then included in a report generated by the facilitator's server. In some implementations, the report further compares the actual revenue of the second financial institution with the predicted future value of revenue. In some implementations, the report is stored, for example, in the facilitator's server. In some implementations, the facilitator's server causes the report to be sent to the second financial institution. Causing the report to be sent to the second financial institution can include, for example, sending data comprising the report to the second financial institution's server, generating a web page including the report and providing the web page to the second financial institution, or instructing a computer program or a human being to send the report to the financial institution In some implementations, the facilitator's server requests payment from the second financial institution for its services. In these implementations, the facilitator's server calculates a fee amount. The fee amount, for example, can be a flat amount based on an agreement with the second financial institution, can be based on the predicted future revenue from the periodic financial obligation, or can be based on the actual revenue received from making payments to meet the periodic financial obligation. The fee amount can be a one-time payment made at the time the user switches to using the second financial institution to make payments, and/or the fee amount can be a recurring amount based on each automatic payment the user makes through the second financial institution (e.g., 40% of the revenue earned from each payment). The fee amount is optionally stored, e.g. in the facilitator's server. The facilitator's server causes a payment request specifying the fee amount to be sent to the financial institution. For example, the facilitator's server can send data comprising the request to the second financial institution's server (e.g., through a network), the facilitator's server can generate a web page including the request and provide the web page to the second financial institution, or the facilitator's server can instruct a computer program or a human being to send the request to the financial institution. Data indicating that a payment equal to the fee amount has been received from the second financial institution is then received in the facilitator's server.

FIG. 5 is a screen shot of an example user interface. The user interface lists several specific billers 502, each of whom the facilitator's server has associated with a periodic financial obligation. The user interface can further display the dates on which each specific biller was last paid 504 and the amounts of the last payments 506. For example, the user interface shows that ATT Phone Bill was last paid an amount of $79.00 on Dec. 29, 2008. To select a specific biller to whom automatic payments should be made, the user can select a box from the boxes 508 beside each biller and then press the continue button 510. For example, to indicate that automatic payments should be made for the ATT Phone Bill, the user can select the box 512 and then click the continue button 510.

Additional information can be displayed in the user interface. For example, the user interface can identify the account from which the user was previously making payments 514 (here, "Citibank account"). This account corresponds to the transaction data that the facilitator's server collected and used to identify the specific billers. The user interface can also specify the account to which the payments will be transferred 516 (here, "Chase Credit Card"), e.g., the financial institution that will be making future payments in response to the specific biller's request for payment, once the payments are transferred.

The user interface can further provide the user with additional financial information. For example, the user can click on "Bills Overview" 518 to be shown an overview of his or her bills, and the user can click on "Payment Activity" 520 to see recent payment activity on one or more of his accounts.

In some implementations, the user interface is branded, for example at 522, with a logo or other information from the financial institution to whom the payments are being switched or the logo or other information of the facilitator.

Figure 6:
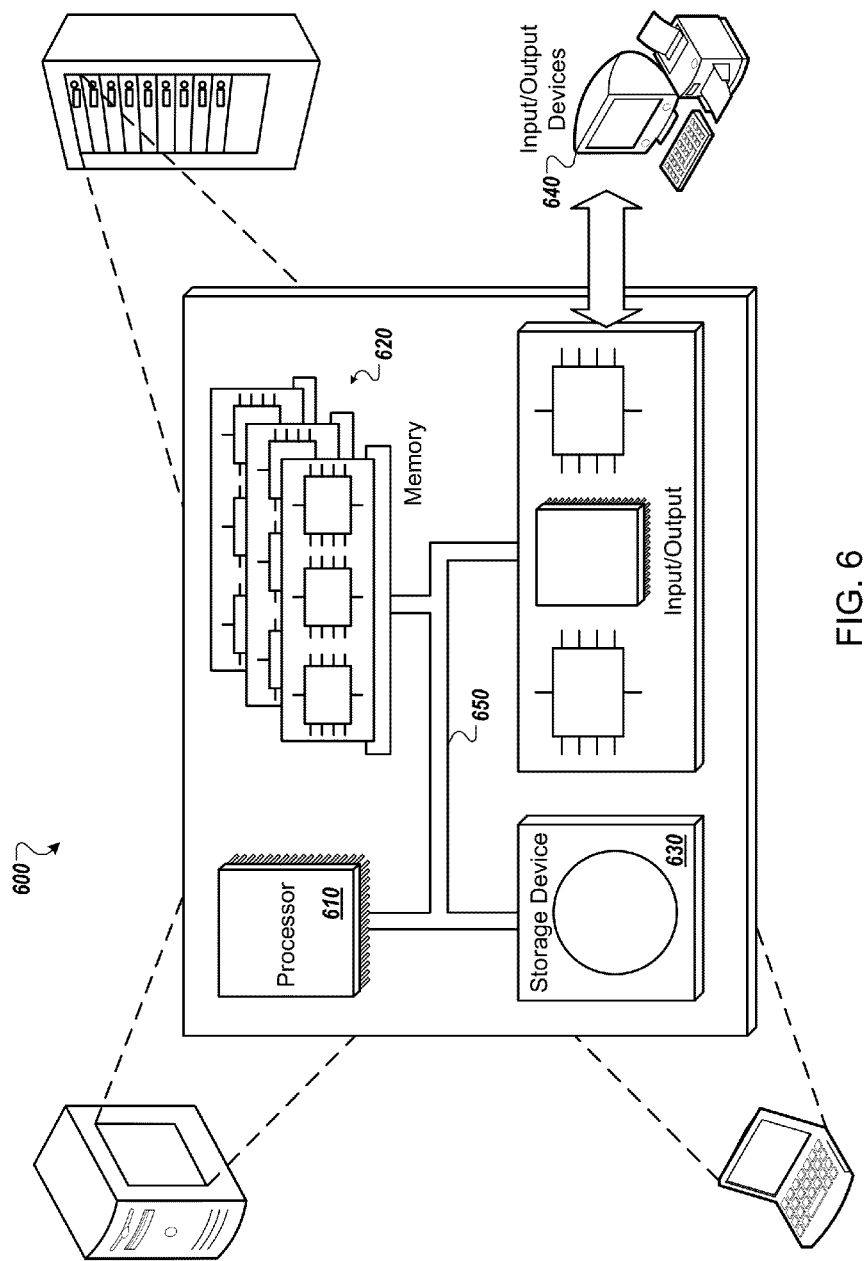
FIG. 6 is a schematic diagram of a generic computer system.

FIG. 6 is a schematic diagram of an example of a generic computer system 600. The system 600 can be used for the operations described above according to FIG. 2 in one implementation. For example, the system 600 may be included in either or all of the facilitator's server 202, the first financial institution's server 226, the second financial institution's server 230, the specific biller's computer 234, and the user's computer 236.

The system 600 includes a processor 610, a memory 620, a storage device 630, and an input/output device 640. Instructions that implement operations associated with the methods described above can be stored in the memory 620 or on the storage device 630. Each of the components 610, 620, 630, and 640 are interconnected using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 may be a floppy disk device, a hard disk device, an optical disk device, or a tape device.

The input/output device 640 provides input/output operations for the system 600. In some implementations, the input/output device 640 includes a keyboard and/or pointing device. In another implementation, the input/output device 640 includes a display unit for displaying graphical user interfaces.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
collecting, in a first computer system, data corresponding to one or more user transactions from a second computer system of a first financial institution, where each transaction is an individual payment made by the first financial institution, wherein the data describes respective individual payments;
extracting, from the data corresponding to the one or more user transactions, information that identifies one or more periodic financial obligations of a first user, wherein each periodic financial obligation is a regularly repeating obligation that the first user owes to a particular biller;
identifying, from the extracted information, the one or more periodic financial obligations of the first user;
associating, in the first computer system, a specific biller with each identified periodic financial obligation;
providing a visual user interface to a client computer of the first user, where the visual user interface identifies one or more specific billers, where each specific biller is associated with at least one of the periodic financial obligations of the first user, and where the visual user interface provides a mechanism through which the first user can submit a make-payments notification identifying one of the one or more specific billers;
receiving, in the first computer system and from the first user, a first make-payments notification, where the first make-payments notification identifies a first specific biller associated with a first periodic financial obligation of the first user and a second financial institution for satisfying the first periodic financial obligation of the first user;
determining, in the first computer system, that the first specific biller is automatically requesting payments to satisfy the first periodic financial obligation from the first financial institution, wherein automatically requesting payments to satisfy the first periodic obligation includes the first specific biller charging or debiting an account of the first user at the first financial institution without direct user input; and
in response to determining that the first specific biller is automatically requesting payments to satisfy the first periodic financial obligation from the first financial institution, sending a first cease-billing instruction to the first specific biller, where the first cease-billing instruction instructs the first specific biller to stop requesting payments to satisfy the first periodic financial obligation from the first financial institution, and sending a first billing instruction to the first specific biller, where the first billing instruction instructs the first specific biller to automatically request payments from a second financial institution to satisfy the first periodic financial obligation;
collecting, in the first computer system, additional data corresponding to one or more additional user transactions; and
examining, by the first computer system, the additional data to determine when the first financial institution has stopped making payments to the first specific biller to meet the first periodic financial obligation.

2. The method of claim 1, wherein:
the first specific biller is automatically requesting payments to satisfy the first periodic financial obligation from the first financial institution.

3. The method of claim 2, wherein:
the data corresponding to one or more user transactions includes a description of each user transaction; and
identifying a periodic financial obligation includes using the descriptions of one or more user transactions to identify automatic payments.

4. The method of claim 1, wherein:
the data corresponding to one or more user transactions includes a description of each user transaction; and
identifying a periodic financial obligation includes using the descriptions of one or more user transactions to identify periodic payments.

5. The method of claim 1, further comprising:
categorizing one or more user transactions into a respective transaction category, and
wherein identifying a periodic financial obligation includes using the transaction categories of one or more user transactions.

6. The method of claim 1, wherein:
identifying a periodic financial obligation includes using the identity of a second specific biller with whom the transaction is conducted.

7. The method of claim 1, wherein:
the first specific biller is further associated with a second periodic financial obligation of the first user; and
the method further comprises:
determining whether the first specific biller is automatically requesting payments to satisfy the second periodic financial obligation from a third financial institution, and if so, causing a second cease-billing instruction to be sent to the first specific biller, where the second cease-billing instruction instructs the first specific biller to stop requesting payments to satisfy the second periodic financial obligation from the third financial institution; and
causing a second billing instruction to be sent to the first specific biller, where the second billing instruction instructs the second biller to automatically request payments from a second financial institution to satisfy the second periodic financial obligation.

8. The method of claim 1, further comprising:
receiving in the first computer system an enrollment notification, where the enrollment notification indicates that the first user authorizes the collection of the data corresponding to the one or more automatic user transactions.

9. The method of claim 1, further comprising:
for each identified periodic financial obligation, predicting in the first computer system a future value of revenue for the second financial institution associated with making payments to a specific biller to meet the periodic financial obligation.

10. The method of claim 9, further comprising:
calculating an incentive associated with each identified specific biller, where the incentive is a benefit the first user will receive for requesting that the second financial institution make payments to the specific biller to meet one or more periodic financial obligations, where the incentive is calculated based on the predicted future value of revenue for the second financial institution associated with making payments to the specific biller to meet the one or more periodic financial obligations; and
wherein the visual user interface further displays the incentive associated with each identified specific biller.

11. The method of claim 9, further comprising:
calculating a fee amount;
causing a payment request to be sent to the second financial institution, where the payment request specifies a payment equal to the fee amount; and
receiving a notification in the first computer system that a payment equal to the fee amount has been received from the second financial institution.

12. The method of claim 1, further comprising:
collecting in a first computer system data corresponding to one or more user transactions through a first financial institution;
analyzing the data to determine revenue received by the second financial institution as a result of the payments made to meet the first periodic financial obligation;
generating, in the first computer system, a report of the received revenue; and
causing the report to be sent to the second financial institution.

13. A computer storage medium encoded with a computer program, the computer program comprising instructions, that when executed by data processing apparatus, cause the data processing apparatus to perform operations comprising:
collecting, in a first computer system, data corresponding to one or more user transactions from a second computer system of a first financial institution, where each transaction is an individual payment made by the first financial institution, wherein the data describes respective individual payments;
extracting, from the data corresponding to the one or more user transactions, information that identifies one or more periodic financial obligations of a first user, wherein each periodic financial obligation is a regularly repeating obligation that the first user owes to a particular biller;
identifying, from the extracted information, the one or more periodic financial obligations of the first user;
associating, in the first computer system, a specific biller with each identified periodic financial obligation;
providing a visual user interface to a client computer of the first user, where the visual user interface identifies one or more specific billers, where each specific biller is associated with at least one of the periodic financial obligations of the first user, and where the visual user interface provides a mechanism through which the first user can submit a make-payments notification identifying one of the one or more specific billers;
receiving, in the first computer system and from the first user, a first make-payments notification, where the first make-payments notification identifies a first specific biller associated with a first periodic financial obligation of the first user and a second financial institution for satisfying the first periodic financial obligation of the first user;
determining, in the first computer system, that the first specific biller is automatically requesting payments to satisfy the first periodic financial obligation from the first financial institution, wherein automatically requesting payments to satisfy the first periodic obligation includes the first specific biller charging or debiting an account of the first user at the first financial institution without direct user input; and
in response to determining that the first specific biller is automatically requesting payments to satisfy the first periodic financial obligation from the first financial institution, sending a first cease-billing instruction to the first specific biller, where the first cease-billing instruction instructs the first specific biller to stop requesting payments to satisfy the first periodic financial obligation from the first financial institution, and sending a first billing instruction to the first specific biller, where the first billing instruction instructs the first specific biller to automatically request payments from a second financial institution to satisfy the first periodic financial obligation;
collecting, in the first computer system, additional data corresponding to one or more additional user transactions; and
examining, by the first computer system, the additional data to determine when the first financial institution has stopped making payments to the first specific biller to meet the first periodic financial obligation.

14. A system comprising one or more computers programmed to perform operations comprising:
collecting, in a first computer system, data corresponding to one or more user transactions from a second computer system of a first financial institution, where each transaction is an individual payment made by the first financial institution, wherein the data describes respective individual payments;
extracting, from the data corresponding to the one or more user transactions, information that identifies one or more periodic financial obligations of a first user, wherein each periodic financial obligation is a regularly repeating obligation that the first user owes to a particular biller;
identifying, from the extracted information, the one or more periodic financial obligations of the first user;
associating, in the first computer system, a specific biller with each identified periodic financial obligation;
providing a visual user interface to a client computer of the first user, where the visual user interface identifies one or more specific billers, where each specific biller is associated with at least one of the periodic financial obligations of the first user, and where the visual user interface provides a mechanism through which the first user can submit a make-payments notification identifying one of the one or more specific billers;
receiving, in the first computer system and from the first user, a first make-payments notification, where the first make-payments notification identifies a first specific biller associated with a first periodic financial obligation of the first user and a second financial institution for satisfying the first periodic financial obligation;
determining, in the first computer system, that the first specific biller is automatically requesting payments to satisfy the first periodic financial obligation from the first financial institution, wherein automatically requesting payments to satisfy the first periodic obligation includes the first specific biller charging or debiting an account of the first user at the first financial institution without direct user input; and in response to determining that the first specific biller is automatically requesting payments to satisfy the first periodic financial obligation from the first financial institution, sending a first cease-billing instruction to the first specific biller, where the first cease-billing instruction instructs the first specific biller to stop requesting payments to satisfy the first periodic financial obligation from the first financial institution, and sending a first billing instruction to the first specific biller, where the first billing instruction instructs the first specific biller to automatically request payments from a second financial institution to satisfy the first periodic financial obligation;

collecting, in the first computer system, additional data corresponding to one or more additional user transactions; and examining, by the first computer system, the additional data to determine when the first financial institution has stopped making payments to the first specific biller to meet the first periodic financial obligation.

15. The system of claim 14, wherein:
the first specific biller is automatically requesting payments to satisfy the first periodic financial obligation from the first financial institution;
the data corresponding to one or more user transactions includes a description of each user transaction; and
identifying a periodic financial obligation includes using the descriptions of one or more user transactions to identify automatic payments.

16. The system of claim 14, wherein:
the data corresponding to one or more user transactions includes a description of each user transaction; and
identifying a periodic financial obligation includes using the descriptions of one or more user transactions to identify periodic payments.

17. The system of claim 14, wherein the one or more computers are further programmed to perform operations comprising:
categorizing one or more user transactions into a respective transaction category, and
wherein identifying a periodic financial obligation includes using the transaction categories of one or more user transactions.

18. The system of claim 14, wherein:
the first specific biller is further associated with a second periodic financial obligation of the first user; and
the operations further comprise:
determining whether the first specific biller is automatically requesting payments to satisfy the second periodic financial obligation from a third financial institution, and if so, causing a second cease-billing instruction to be sent to the first specific biller, where the second cease-billing instruction instructs the first specific biller to stop requesting payments to satisfy the second periodic financial obligation from the third financial institution; and
causing a second billing instruction to be sent to the first specific biller, where the second billing instruction instructs the second biller to automatically request payments from a second financial institution to satisfy the second periodic financial obligation.

19. The system of claim 14, wherein the one or more computers are further programmed to perform operations comprising:
for each identified periodic financial obligation, predicting a future value of revenue for the second financial institution associated with making payments to a specific biller to meet the periodic financial obligation.

20. The system of claim 19, wherein the one or more computers are further programmed to perform operations comprising:
calculating an incentive associated with each identified specific biller, where the incentive is a benefit the first user will receive for requesting that the second financial institution make payments to the specific biller to meet one or more periodic financial obligations, where the incentive is calculated based on the predicted future value of revenue for the second financial institution associated with making payments to the specific biller to meet the one or more periodic financial obligations; and
wherein the visual user interface further displays the incentive associated with each identified specific biller.

21. The system of claim 19, wherein the one or more computers are further programmed to perform operations comprising:
calculating a fee amount;
causing a payment request to be sent to the second financial institution, where the payment request specifies a payment equal to the fee amount; and
receiving a notification that a payment equal to the fee amount has been received from the second financial institution.

22. The method of claim 1, wherein identifying one or more periodic financial obligations of a user from the data comprises:
identifying a user transaction as a periodic financial obligation based on a description of the user transaction, the description describing the user transaction as a monthly service charge.

23. The method of claim 1, wherein identifying one or more periodic financial obligations of a user from the data comprises:
identifying a user transaction as a periodic financial obligation based on a categorization of the user transaction as a periodic payment.

24. The method of claim 1, wherein identifying one or more periodic financial obligations of a user from the data comprises:
identifying a user transaction as a periodic financial obligation based on an identity of a biller associated with the user transaction.

25. The method of claim 1, wherein identifying one or more periodic financial obligations of a user from the data comprises:
identifying, from the one or more user transactions, a plurality of user transactions that each identify a particular biller and a respective payment of a similar amount; and
identifying the plurality of user transactions as periodic financial obligations.

26. The method of claim 1, wherein identifying one or more periodic financial obligations of a user from the data comprises:
identifying, from the one or more user transactions, a plurality of user transactions that each identify a particular biller and a particular date of payment; and
identifying the plurality of user transactions as periodic financial obligations.

27. The method of claim 1, wherein identifying one or more periodic financial obligations of the user from the data comprises identifying one or more periodic financial obligations of the user from the data that are not paid by automatic payment.

28. The system of claim 14, wherein identifying one or more periodic financial obligations of a user from the data comprises:
  identifying a user transaction as a periodic financial obligation based on a description of the user transaction, the description describing the user transaction as a monthly service charge.

29. The system of claim 14, wherein identifying one or more periodic financial obligations of a user from the data comprises:
  identifying a user transaction as a periodic financial obligation based on a categorization of the user transaction as a periodic payment.

30. The system of claim 14, wherein identifying one or more periodic financial obligations of a user from the data comprises:
  identifying a user transaction as a periodic financial obligation based on an identity of a biller associated with the user transaction.

31. The system of claim 14, wherein identifying one or more periodic financial obligations of a user from the data comprises:
  identifying, from the one or more user transactions, a plurality of user transactions that each identify a particular biller and a respective payment of a similar amount; and
  identifying the plurality of user transactions as periodic financial obligations.

32. The system of claim 14, wherein identifying one or more periodic financial obligations of a user from the data comprises:
  identifying, from the one or more user transactions, a plurality of user transactions that each identify a particular biller and a particular date of payment; and
  identifying the plurality of user transactions as periodic financial obligations.

33. The system of claim 14, wherein identifying one or more periodic financial obligations of the user from the data comprises identifying one or more periodic financial obligations of the user from the data that are not paid by automatic payment.

* * * * *